(12) United States Patent
Williams et al.

(10) Patent No.: US 7,431,126 B2
(45) Date of Patent: Oct. 7, 2008

(54) SUPPORT MEANS FOR AN ACOUSTIC LINER USED IN AN AUXILIARY POWER UNIT EXHAUST MUFFLER

(75) Inventors: Nicholas A. Williams, Phoenix, AZ (US); George W. Randall, Phoenix, AZ (US); David H. Beird, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 543 days.

(21) Appl. No.: 11/189,588

(22) Filed: Jul. 25, 2005

(65) Prior Publication Data

US 2006/0207827 A1    Sep. 21, 2006

Related U.S. Application Data

(60) Provisional application No. 60/662,472, filed on Mar. 15, 2005.

(51) Int. Cl.
*B64D 27/26* (2006.01)
*B64D 33/02* (2006.01)
*F02K 11/00* (2006.01)

(52) U.S. Cl. .................. 181/214; 181/217; 244/54

(58) Field of Classification Search .............. 181/214, 181/217, 222, 213; 244/53 B, 54, 55; 285/15, 285/16
See application file for complete search history.

(56) References Cited

U.S. PATENT DOCUMENTS

| | | | |
|---|---|---|---|
| 442,837 A | 12/1890 | Ward | |
| 1,185,014 A | 5/1916 | Shea | |
| 1,301,565 A | 4/1919 | Jacobs | |
| 1,952,381 A | 3/1934 | Lunn | |
| 2,189,159 A * | 2/1940 | Anschicks | 52/461 |
| 2,799,518 A | 7/1957 | Anderson et al. | |
| 2,813,054 A * | 11/1957 | Nicholas | 156/93 |
| 2,892,987 A | 6/1959 | Cedrone | |
| 3,512,805 A * | 5/1970 | Glatz | 285/109 |
| 3,796,057 A * | 3/1974 | Dougherty | 405/251 |
| 4,084,066 A * | 4/1978 | Gillemot | 174/92 |
| 4,099,749 A * | 7/1978 | van Vliet | 285/398 |
| 4,379,473 A | 4/1983 | Kunze | |
| 4,669,762 A * | 6/1987 | Jenkins | 285/331 |
| 4,777,072 A | 10/1988 | Cazon, Jr. | |
| 4,830,061 A * | 5/1989 | Karakawa | 138/168 |
| 4,860,799 A | 8/1989 | Van Noten | |
| 4,861,946 A | 8/1989 | Pichler et al. | |
| 4,865,893 A | 9/1989 | Kunze et al. | |
| 4,941,693 A * | 7/1990 | Spaude et al. | 285/331 |
| 4,951,973 A | 8/1990 | Corsmeier | |
| 5,002,423 A * | 3/1991 | Mileti | 404/6 |
| 5,088,775 A | 2/1992 | Corsmeier et al. | |
| 5,647,358 A * | 7/1997 | Vilasi | 128/207.14 |

* cited by examiner

*Primary Examiner*—Edgardo San Martin
(74) *Attorney, Agent, or Firm*—Ingrassia, Fisher & Lorenz, P.C.

(57) ABSTRACT

The present invention provides support means for an acoustic liner in an APU exhaust system, where the acoustic liner has a tubular sidewall with an outer surface, a first longitudinal edge, a second longitudinal edge, and an axial gap formed between the first and the second longitudinal edges. The APU exhaust system includes an annular support disposed substantially symmetrically about a longitudinal axis and coupled to a portion of the acoustic liner and a linear support disposed at least partially in the acoustic liner axial gap.

20 Claims, 10 Drawing Sheets

SUPPORT MEANS FOR AN ACOUSTIC LINER USED IN AN AUXILIARY POWER UNIT EXHAUST MUFFLER

CROSS-REFERENCE TO RELATED APPLICATIONS

This application claims the benefit of U.S. Provisional Application Ser. No. 60/662,472, filed Mar. 15, 2005.

TECHNICAL FIELD

The present invention relates to an exhaust muffler for use with an airborne auxiliary power unit (APU) exhaust system and, more particularly, to a means to support an acoustic liner inside the APU exhaust system.

BACKGROUND

Many modern aircraft are equipped with an airborne auxiliary power unit ("APU") that provides electrical and pneumatic power to various parts of the aircraft. Typically, APUs include mounts, inlet and exhaust, and pneumatic (bleed) and fire containment systems, including systems for detecting and extinguishing fires. FIG. 1 shows a typical airborne APU 10 installed in the tailcone of an aircraft (shown in dashed outline 15). Some of the systems that support the APU 10 include an inlet system 20, a mount system 25, a pneumatic system 30, and an exhaust system 35. The APU exhaust system 35 may perform various functions, including evacuating APU exhaust gas from the aircraft 15, attenuating exhaust noise, and providing cooling airflow for the aircraft APU compartment when used in conjunction with an eductor system.

To attenuate exhaust noise, the exhaust system 35 may include a muffler section, such as muffler section 100, shown in FIG. 2, which includes an outer can 105 that houses a series of baffles 110 and an acoustic liner 115. Forward 120 and aft 125 end caps terminate the muffler section 100 and are typically attached to components of an eductor system (such as a bellmouth 130 or primary pipe) and the remainder of the exhaust piping 135.

A prior art example of acoustic liner 115 is shown in FIG. 3. The depicted acoustic liner 115 is fabricated from a FeCrAlY alloy, typically referred to as feltmetal. The fabrication of the acoustic liner 115 involves rolling a sheet of feltmetal into a cylinder and then forming a longitudinal weld joint 155. After the acoustic liner 115 is formed to the appropriate shape and welded, it is inserted into the muffler section 100, and attached thereto, typically by riveting 160 the acoustic liner 115 to the bellmouth 130, as shown in FIGS. 4 and 5.

APU exhaust systems having feltmetal acoustic liners typically have a service life of between about 7,000 and 10,000 aircraft hours. When compared to a typical aircraft service life of about 30,000 hours, the APU exhaust system 35 may need to be repaired or replaced several times during the life of the aircraft 15.

The short service life has been attributed to several different factors. For example, the longitudinal weld 155 may introduce a heat affected zone adjacent thereto. Analysis indicates that low cycle fatigue and inter-granular cracking may occur within the heat affected zones of the welds 155. Additionally, the welding process itself may introduce a second phase in the FeCrAlY mesh, which may weaken grain interfaces and contribute to material cracking. Moreover, the holes that are drilled in the feltmetal acoustic liner to accommodate the rivets 160 can introduce stress concentrations, which may in turn initiate fatigue cracking associated with thermal cycling and operational vibration.

Accordingly, there is a need to reduce the failure modes most commonly experienced by the acoustic liner by eliminating the longitudinal weld in the acoustic liner and also eliminating the annular pattern of rivets used for attachment of the acoustic liner. Furthermore, other desirable features and characteristics of the present invention will become apparent from the subsequent detailed description and the appended claims, taken in conjunction with the accompanying drawings and the foregoing technical field and background.

BRIEF SUMMARY

The present invention provides an auxiliary power unit (APU) exhaust system. In one exemplary embodiment, the system includes an annular bellmouth, an acoustic liner, an annular support, and a linear support. The annular bellmouth has an outer surface. The acoustic liner has a tubular sidewall that is at least partially disposed proximate the annular bellmouth. The tubular sidewall has an outer surface, a first longitudinal edge, a second longitudinal edge, and an axial gap formed between the first and the second longitudinal edges. The annular support is disposed substantially symmetrically about a longitudinal axis, and comprises a weld leg, a flexural bed, and a clamping surface. The weld leg is coupled to the annular bellmouth outer surface. The flexural bend has a first end extending from the weld leg and a second end. The clamping surface extends from the flexural bend second end, and contacts and supplies a force against the acoustic liner outer surface. The linear support is disposed at least partially in the acoustic liner axial gap and comprises a longitudinal clamping element and a back strip. The longitudinal clamping element has a weld section, a flexural bend having a first end extending from the weld section and a second end, and a clamping surface extending from the flexural bend second end. The back strip has a first section coupled to the longitudinal clamping element weld section and a second section forming a longitudinal gap with the clamping surface, wherein the first longitudinal edge is disposed within the longitudinal gap.

In another embodiment, and by way of example only, an annular support is provided for use in an exhaust muffler system and for coupling to an acoustic liner which is disposed substantially symmetrically about a longitudinal axis. The annular support comprises a weld leg, a flexural bend, and a clamping surface. The weld leg is configured to extend substantially parallel to the longitudinal axis. The flexural bend has a first end extending from the weld leg and a second end. The clamping surface extends from the flexural bend second end, the clamping surface configured to contact and supply a force against the acoustic liner outer surface.

In still another embodiment, and by way of example only, a linear support is provided for use with an acoustic liner of an exhaust system, where the acoustic liner has a tubular sidewall and a longitudinal axis extending therethrough, the sidewall has an outer surface, a first longitudinal edge, a second longitudinal edge, and an axial gap formed between the first and second longitudinal edges. The linear support includes a clamping element and a back strip. The clamping element is configured to extend parallel to the longitudinal axis, and has a weld section, a flexural bend having a first end extending from the weld section and a second end, and a clamping surface extending from the flexural bend second end. The back strip is configured to extend parallel to the longitudinal axis and has a first section and a second section. The first section is coupled to the clamping element weld section, and the second section adjacent the first section and forming a longitudinal gap with the clamping surface.

In yet another embodiment, and by way of example only, an auxiliary power unit (APU) exhaust system is provided that comprises an annular bellmouth, an acoustic liner, and an annular support. The annular bellmouth has an outer surface. The acoustic liner has a tubular sidewall at least partially disposed proximate the annular bellmouth, and the tubular sidewall has an outer surface. The annular support is disposed substantially symmetrically about a longitudinal axis and comprises a weld leg, a flexural bend, and a clamping surface. The weld leg is coupled to the annular bellmouth outer surface. The flexural bend has a first end extending from the weld leg and a second end. The clamping surface extends from the flexural bend second end, the clamping surface contacting and supplying a force against the acoustic liner outer surface.

In still yet another embodiment, and by way of example only, the auxiliary power unit (APU) exhaust system comprises an annular bellmouth, an acoustic liner, and a linear support. The annular bellmouth has an outer surface. The acoustic liner has a tubular sidewall at least partially disposed proximate the annular bellmouth, and the tubular sidewall having an outer surface, a first longitudinal edge, a second longitudinal edge, and an axial gap formed between the first and the second longitudinal edges. The linear support is disposed at least partially in the acoustic liner axial gap and includes a longitudinal clamping element and a back strip. The longitudinal clamping element has a weld section, a flexural bend having a first end extending from the weld section and a second end, and a clamping surface extending from the flexural bend second end. The back strip has a first section coupled to the longitudinal clamping element weld section and a second section forming a longitudinal gap with the clamping surface, wherein the first longitudinal edge is disposed within the longitudinal gap.

Other independent features and advantages will become apparent from the following detailed description, taken in conjunction with the accompanying drawings which illustrate, by way of example, the principles of the invention.

BRIEF DESCRIPTION OF THE DRAWINGS

The following drawings are illustrative of the particular embodiments of the invention and therefore do not limit its scope. They are presented to assist in providing a proper understanding of the invention. The drawings are not to scale and are intended for use in conjunction with the explanations in the following detailed descriptions. The present invention will hereinafter be described in conjunction with the appended drawings, wherein like reference numerals denote like elements, and.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
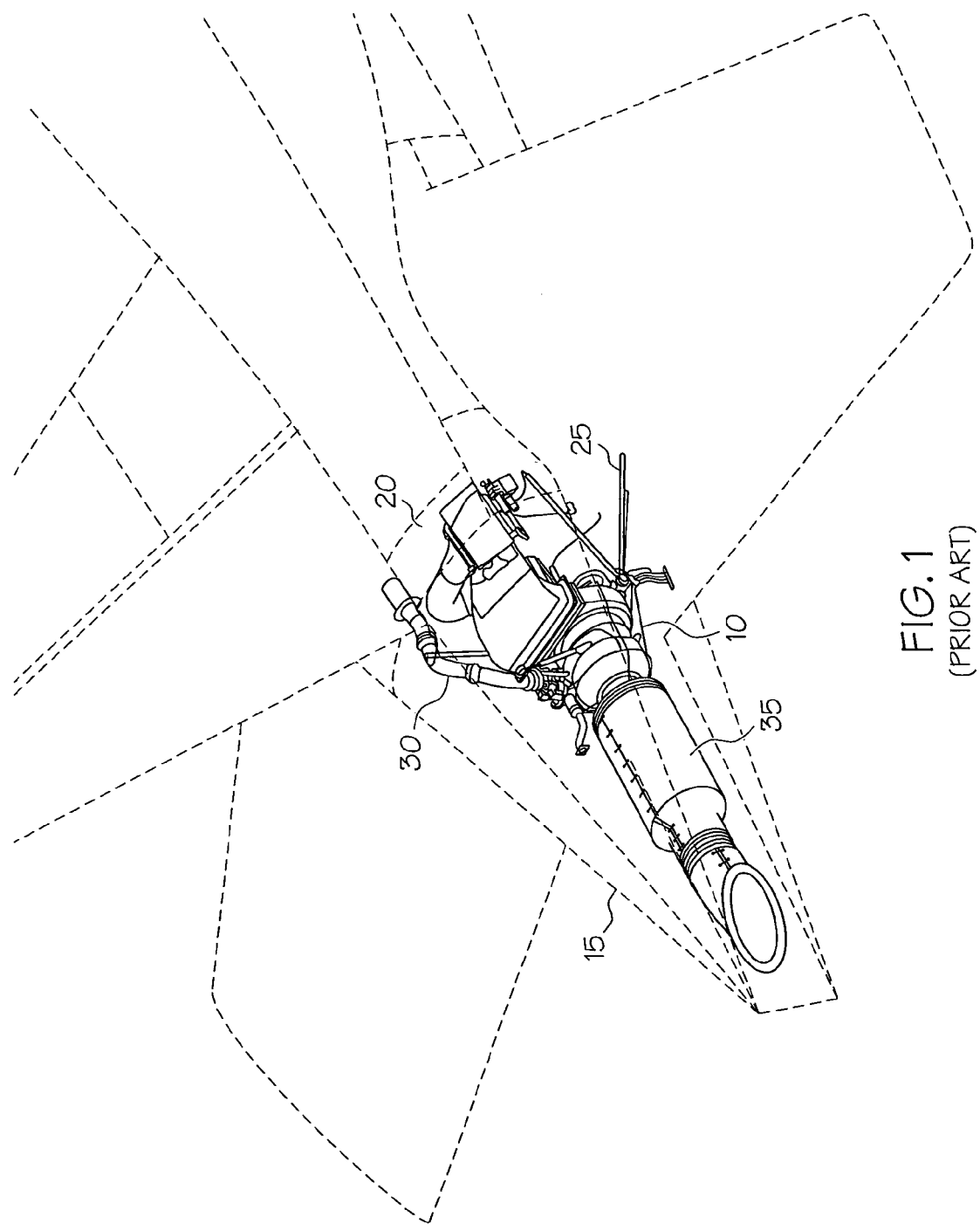
FIG. 1 shows a typical airborne auxiliary power unit and some of the key systems required for proper operation of the auxiliary power unit installed in the tailcone of an aircraft.
Figure 2:
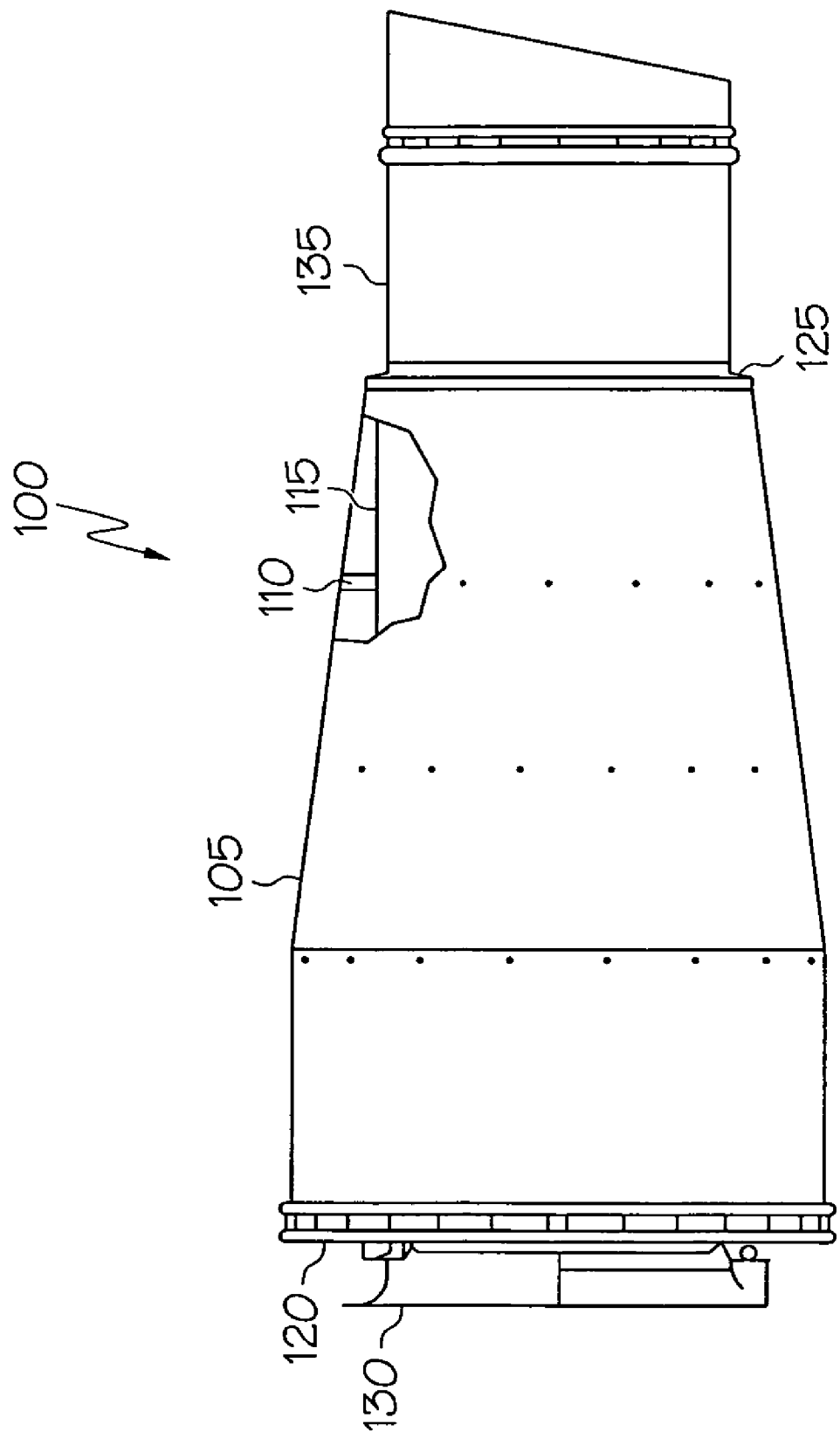
FIG. 2 is a side view showing an APU exhaust system.
Figure 5:
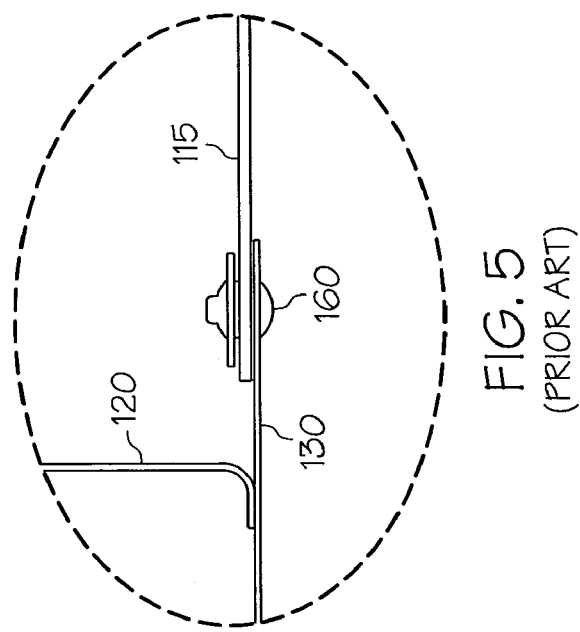
FIG. 5 is a view of the prior art riveted joint shown in FIG. 4 in greater detail.
Figure 3:
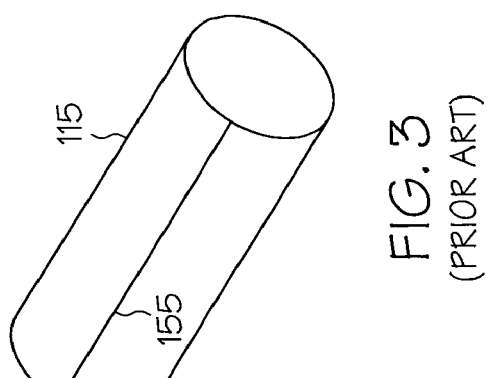
FIG. 3 is an isometric view showing a prior art acoustic liner.
Figure 4:
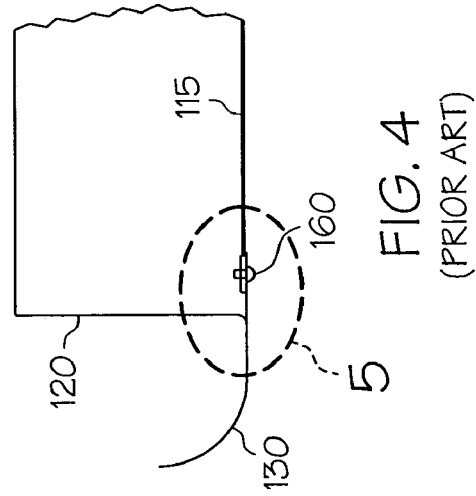
FIG. 4 is a partial longitudinal cross section of the forward portion of a muffler section showing a prior art riveted joint between an acoustic liner and the aft portion of the bellmouth.
Figure 6:
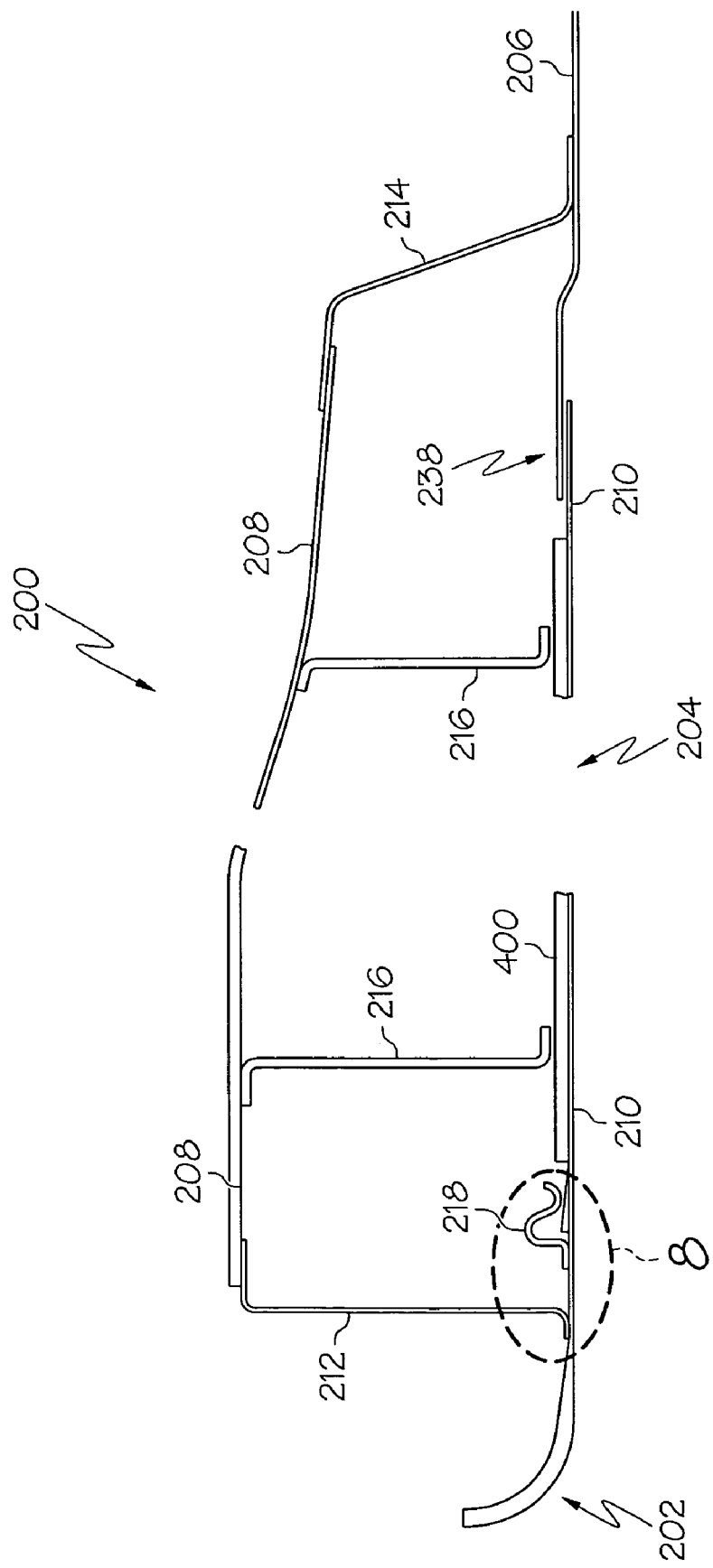
FIG. 6 is a longitudinal cross-sectional view showing one embodiment of an APU exhaust system with the support means of the present invention.

FIG. 6 is a longitudinal cross-sectional view showing one embodiment of an auxiliary power unit (APU) exhaust muffler 200 which includes a bellmouth 202, a muffler section 204, and an exhaust pipe 206. The muffler section 204 includes a tubular outer can 208 surrounding a tubular acoustic liner 210, a forward end cap 212, an aft end cap 214, and a plurality of baffles 216. The outer can 208 and acoustic liner 210 are often cylindrical in shape, but can also be an elliptical or an irregular polygonal shape. The forward end cap 212 and aft end cap 214 are of a shape suitable to accommodate the muffler section 204 and the adjoining sections of the APU exhaust muffler 200. The forward end cap 212 is attached to the bellmouth 202 and the outer can 208, and the aft end cap 214 is joined to the outer can 208 and the exhaust pipe 206. The plurality of baffles 216, the quantity and size of which may vary depending, for example, on the acoustic needs of each aircraft model and mission profile, are formed sheet metal rings that attach to the outer can 208 on an outer periphery of the baffles 216 and provide support for the acoustic liner 210. The exhaust pipe 206 is preferably a formed sheet metal component that provides a flow path for APU exhaust gases from the muffler section 204 to flow overboard the aircraft. The aft end of the acoustic liner 210 is slidably coupled 238 to the exhaust pipe 206. The outer can 208 may be covered with a removable thermal blanket (not shown). The various sections of the APU exhaust muffler 200, and details therein, can be joined together by a number of techniques, including, but not limited to, welding, brazing, bonding, and mechanical fasteners, such as rivets, screws, or bolts.

Figure 7:
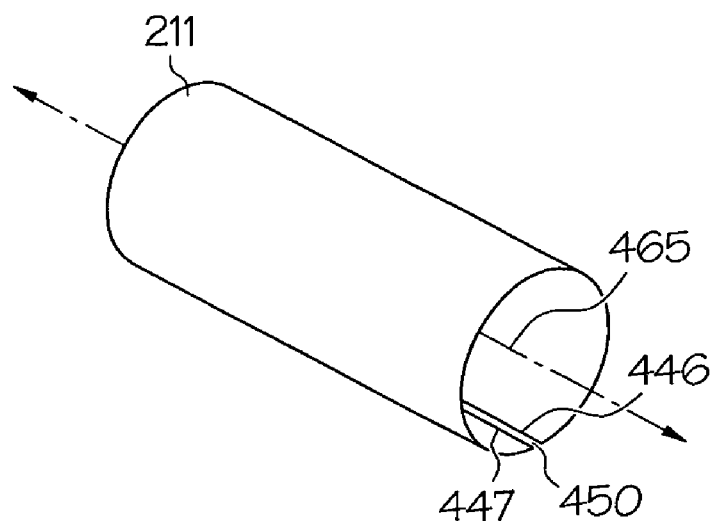
FIG. 7 is an isometric view showing an acoustic liner for use with the APU exhaust system of FIG. 6.

As previously mentioned, the acoustic liner 210 may be substantially cylindrical. Turning to FIG. 7, an isometric view of the acoustic liner 210 is provided. The acoustic liner 210 has a sidewall 211 that is disposed substantially symmetrically about a longitudinal axis 465 and is preferably made of feltmetal. Additionally, the acoustic liner 210 includes an axial gap 450 that is formed between two longitudinal edges 446, 447.

Returning to FIG. 6, the acoustic liner 210 may be secured to the muffler section 204 via an annular support 218. In particular, the annular support 218 is installed about the bellmouth 202 and acoustic liner 210 such that the acoustic liner 210 is supported by the annular support 218 at the bellmouth 202, rather than by a riveted joint. While a bellmouth 202 is shown in the figure, the annular support 218 may alternatively be used at the aft end of the exhaust muffler 200 attached to the exhaust pipe 206 to reduce the vibration of the acoustic liner 210.

Figure 8:
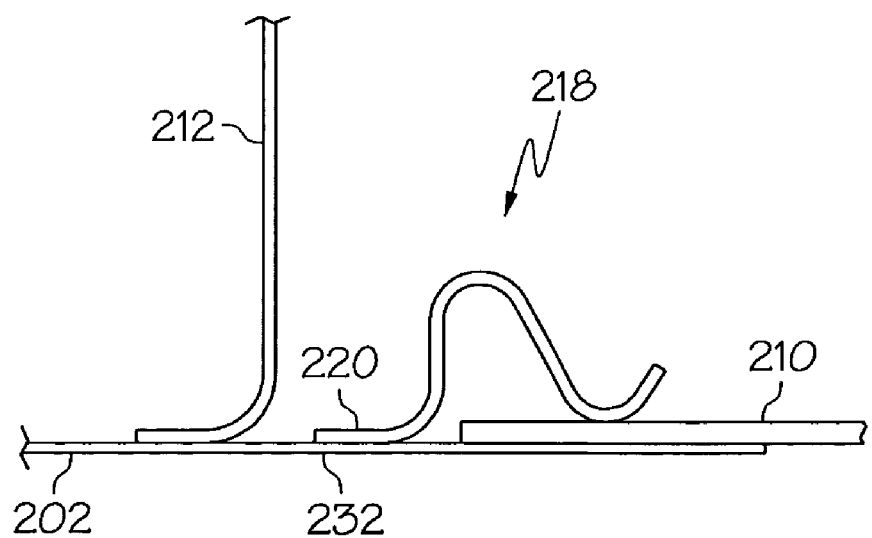
FIG. 8 is an enlarged sectional view showing an annular support installed on a bellmouth holding an acoustic liner.
Figure 9:
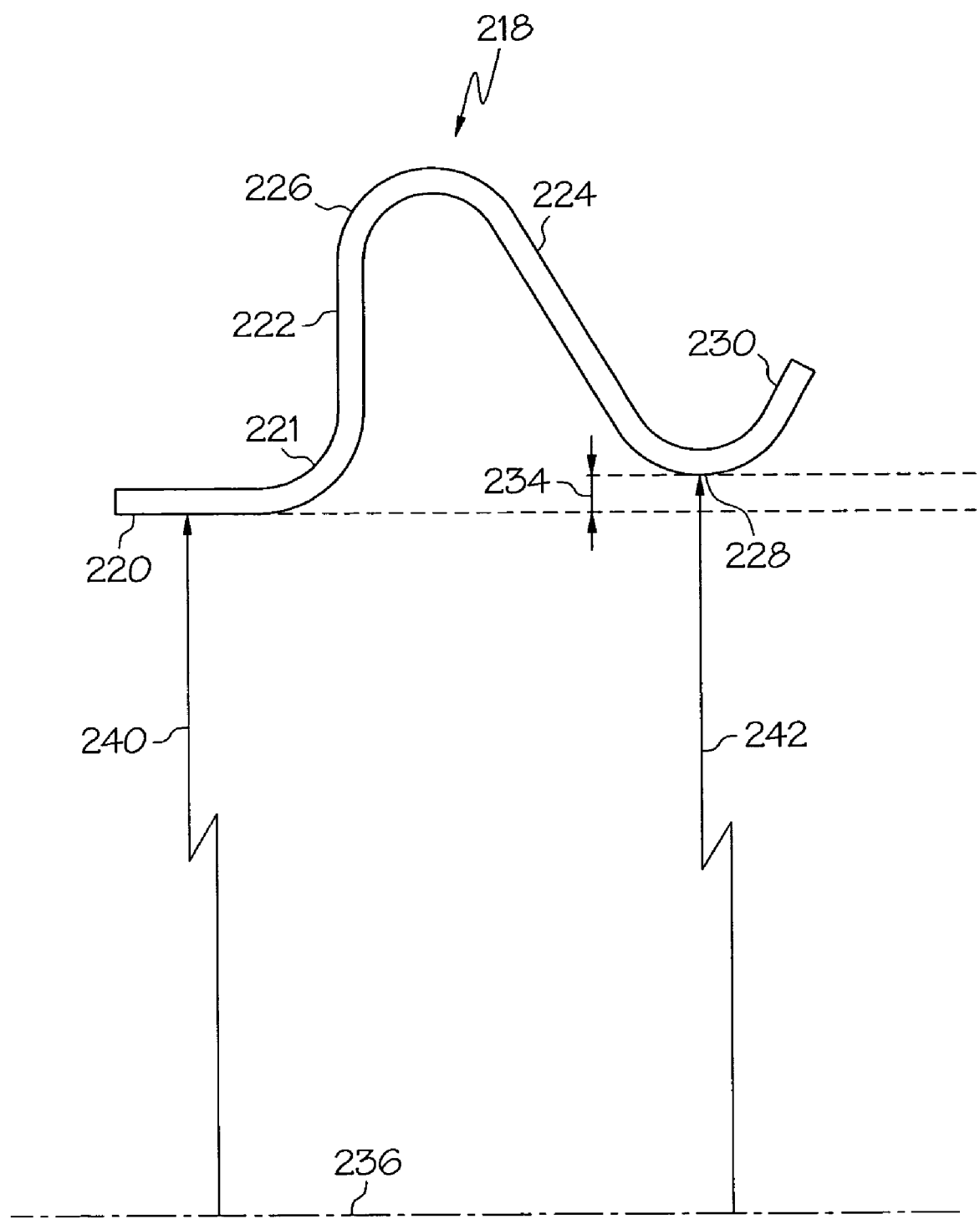
FIG. 9 is a sectional view showing some dimensional aspects of the annular support of FIG. 8 from the axis of revolution or centerline of the muffler.

The annular support 218, of which a cross-sectional profile is shown in FIG. 8, is preferably formed as a sheet metal ring which provides continuous circumferential support of the acoustic liner 210. The annular support 218 is shaped to include a plurality of regions: a weld leg 220; an upright 222; a flexural leg 224; a flexural bend 226; a clamping surface 228; and, a lead-in 230. With reference now to FIG. 9, each of these regions will now be described in more detail.

The weld leg 220 runs parallel to an axis of revolution 236 of the annular support 218 (which is coincident with the centerline of the muffler) and provides a functional interface region between the annular support 218 and an outer peripheral surface of the aft portion of the bellmouth 202. An inner radius 240 of the weld leg 220 is suitably sized to engage the outer peripheral surface of the aft portion of the bellmouth 202. The length of the weld leg 220 is appropriately sized to accommodate the attachment method used.

The upright 222 is disposed substantially normal to the weld leg 220. The smallest diameter of the upright 222 is sized to suit the outside diameter of the weld leg 220, compensating for the formed bend 221 between the two. The largest diameter of the upright 222 is sized to provide adequate support and clearance for the acoustic liner 210.

The flexural leg 224 of the annular support 218 forms an acute angle with the upright 222 and deviates axially therefrom away from the weld leg 220. The length of the flexural leg 224 is determined by the radial location of the clamping surface 228 relative to the axis of revolution 236 and the bend radius of the flexural bend 226. The flexural bend 226 provides a smooth transition between the upright 222 and the flexural leg 224 and has a bend radius and an angular tangency point that may be determined by the support requirements of, and the localized loading limitations on, the acoustic liner 210.

The clamping surface 228 of the annular support 218 is a bend tangent to the end of the flexural leg 224 opposite the flexural bend 226. The clamping surface 228 deviates radially from the axis of rotation and axially from the flexural leg 224 in a direction opposite the upright 222. The bend radius of the clamping surface 228 is sized to minimize any localized loading that may be imparted on the acoustic liner 210, while still providing adequate support. In another embodiment, a linear segment (not shown) substantially parallel to the axis of revolution 236 may also be incorporated into the clamping surface 228 to further reduce localized loading on the acoustic liner 210 if needed. The included angle of the minor arc formed by the clamping surface 228 is approximately twice the acute angle formed between the upright 222 and the flexural leg 224. The radial distance 242 from the axis of revolution 236 to the clamping surface 238 is dependent on the support needs and sizing of the acoustic liner 210. The diameter of the aft portion of the bellmouth 202 is also considered in the design of the clamping surface 228, as will be discussed later.

The lead-in 230 is a short curvilinear extension of the clamping surface 228. The lead-in 230 is tangent to the clamping surface 228 and is sized to guide the acoustic liner 210 into the annular support 218 during assembly of the exhaust muffler 200.

A gap 234 is formed between the clamping surface 228 of the annular support 218 and the outer peripheral surface of the aft portion of the bellmouth 202. The gap 234 is slightly smaller than the thickness of the acoustic liner 210. The gap 234 allows an interference fit of the acoustic liner 210 between the annular support 218 and the aft portion of the bellmouth 202.

During installation, the annular support 218 is slipped over the outer peripheral surface of the aft portion of the bellmouth 202. The weld leg 220 is then welded 232 to the aft portion of the bellmouth 202 in a manner suitable to the particular application. In other embodiments, the weld leg 220 may mechanically fasten the annular support 218 to the aft portion of the bellmouth 202, such as by brazing, riveting, or bolting. Upon installation, the acoustic liner 210 will deflect the clamping surface 228 of the annular support 218 radially outward (relative to the axis 236) as a result of elastic deformation in the flexural leg 224 and the flexural bend 226. Additional elastic deformation of the upright 222 where it interfaces with the weld leg 220 may also be present.

Figure 10:
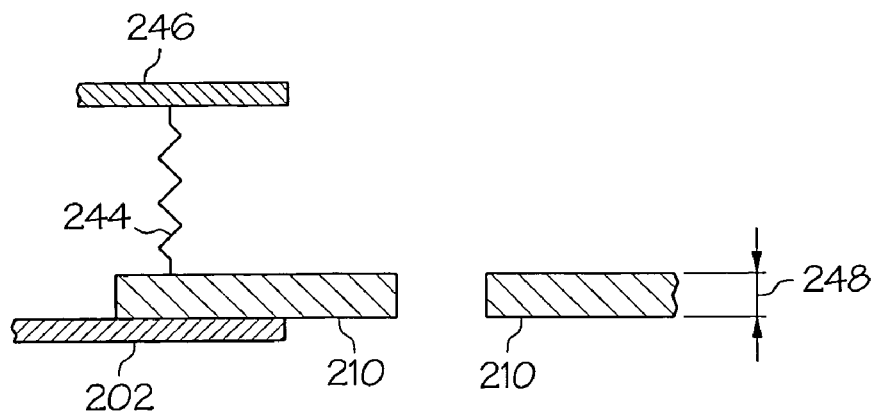
FIG. 10 is a schematic representation showing the forces acting upon the acoustic liner by the annular support.

As shown in FIG. 10, the annular support 218 effectively acts as a radial spring 244 between a virtual fixed support 246 and the acoustic liner 210. The aft portion of the bellmouth 202 provides an effective ground plane for the radial spring 244 to act against. The radial spring 244 imparts a force per unit of circumference, which is proportional to the radius of revolution, and has an equivalent spring constant $k_{eq}$ which imparts a force 248 proportional to the displacement of the annular support 218 that results from the interference fit of the acoustic liner 210. The equivalent spring constant is a function of the geometry of the annular support 218 and the materials used in its fabrication. In particular, the equivalent spring constant is proportional to the stock thickness of the annular support 218 and the modulus of elasticity of the material, and is inversely proportional to the acute angle between the flexural leg 224 and the upright 222, the radius of the flexural bend 226, and the radius of revolution of the annular support 218.

Figure 11A:
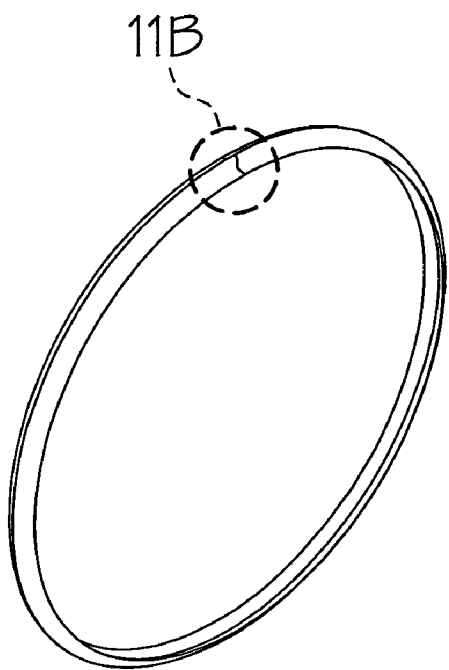
FIG. 11A is an isometric view of an exemplary annular support.
Figure 11B:
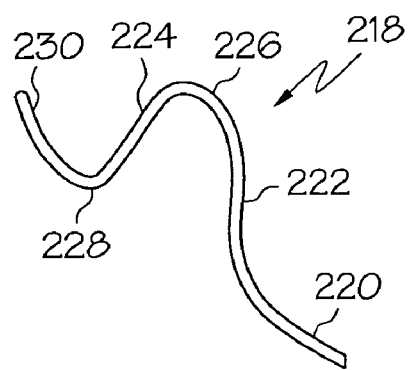
FIG. 11B is a close-up view of a portion of the exemplary annular support depicted in FIG. 11A.
Figure 12:
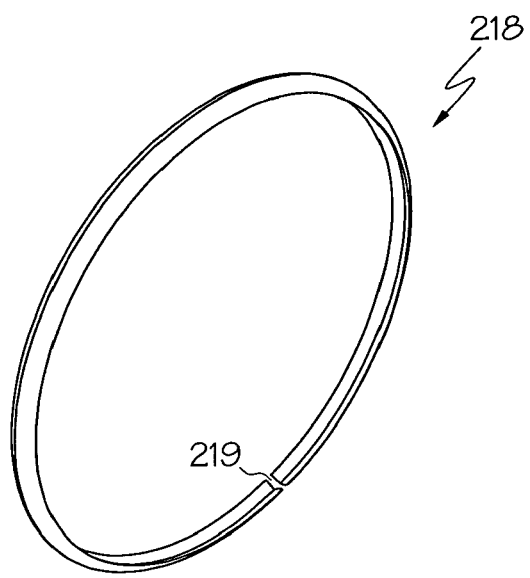
FIG. 12 is an isometric view of another exemplary annular support.
Figure 13:
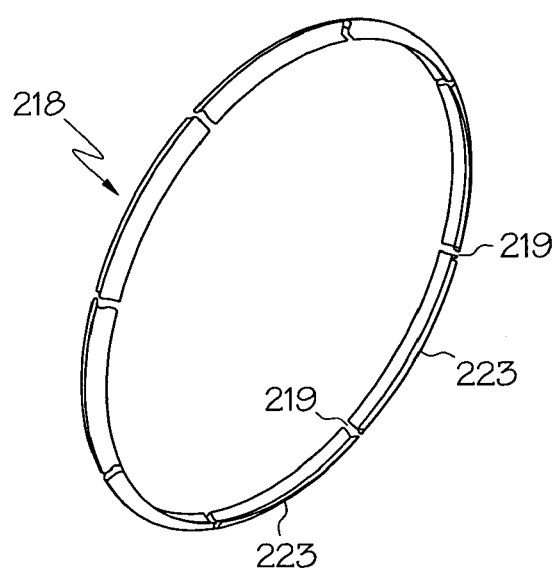
FIG. 13 is an isometric view of still another exemplary annular support.
Figure 14:
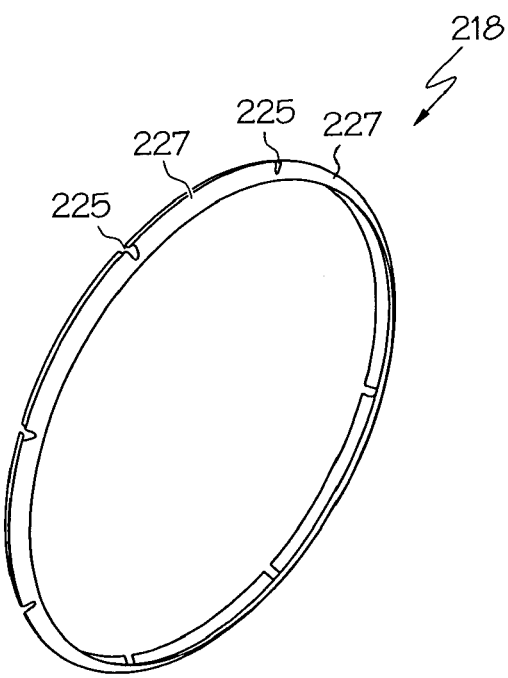
FIG. 14 is an isometric view of yet another exemplary annular support.

It will be appreciated that the annular support 218 may be a closed section annulus (complete ring), as illustrated in FIGS. 11A and 11B, or may have any one of numerous other configurations. For example, as shown in FIG. 12, the annular support 218 may alternatively be non-continuous and may include a cut 219 formed therein. In another example, shown in FIG. 13, the channel 218 includes a plurality of cuts 219 creating a plurality of segments 223. Alternatively, shown in FIG. 14, the channel 218 is a closed section annulus that has a plurality of notches 225 formed therein to partially separate the channel 218 into partial segments 227.

Figure 15:
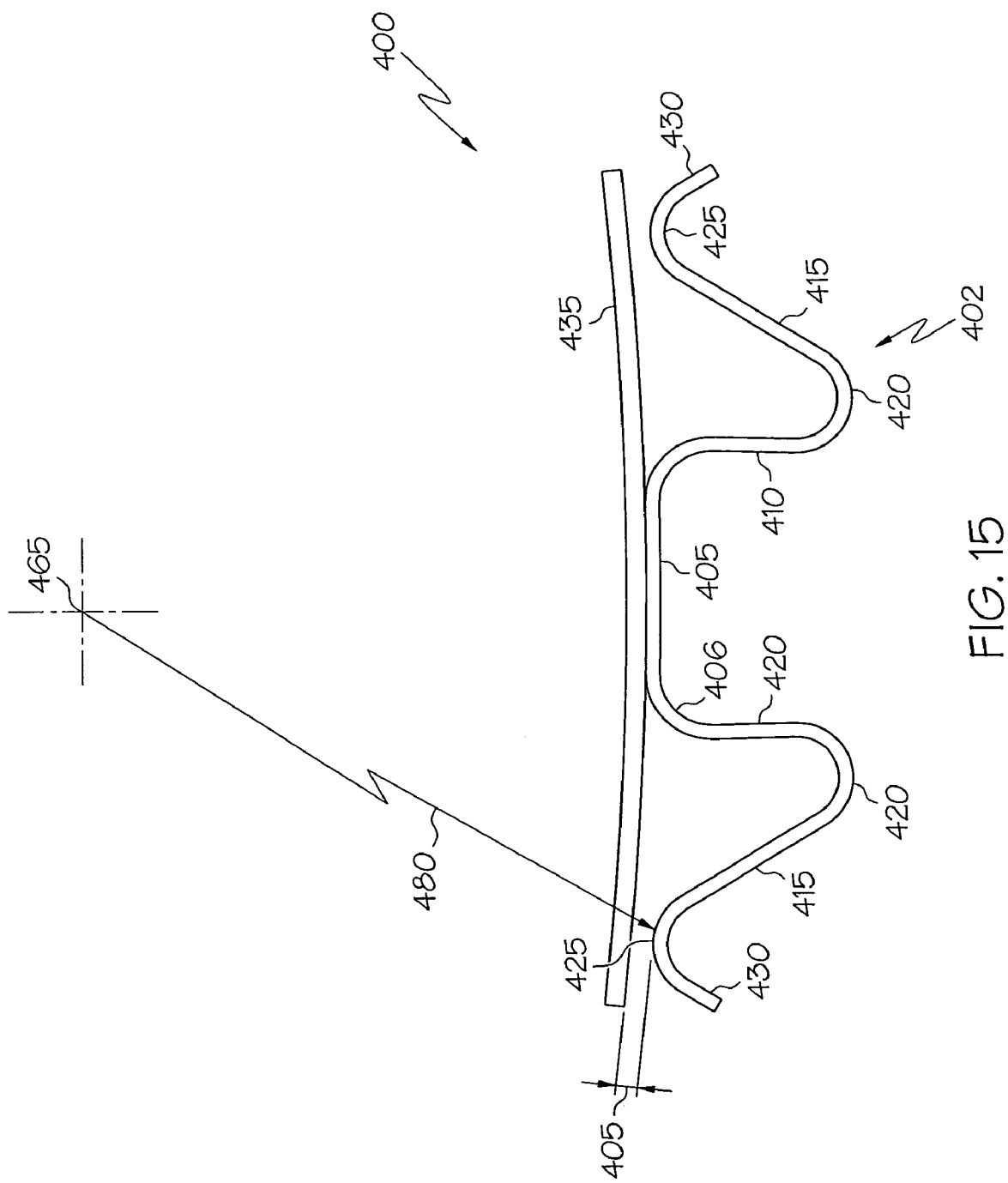
FIG. 15 is a cross-sectional view showing some dimensional aspects of an exemplary linear support from the axis of revolution or centerline of the muffler.

Turning back to FIG. 6, the acoustic liner 210 may be maintained in a cylindrical shape using a linear support 400. The linear support 400, a cross-section of which is shown in FIG. 15, is a sheet metal fabrication made of an extruded clamp element 402 and a back-strip 435 coupled together. The clamp element 402 includes two uprights 410, two flexural bends 420, two flexural legs 415, two clamping surfaces 425, and two lead-ins 430. Each pair of components is substantially symmetrically disposed around a weld section 405.

The weld section 405 is a curvilinear segment which is configured to be disposed substantially parallel to the acoustic liner 210. The weld section 405 cooperates with the back-strip 435 to provide a functional interface region for the acoustic liner 210 and has a minor arc radius that may be typically comparable to the radius of the acoustic liner 210.

The upright 410 is disposed substantially normal to a tangent at an end of the weld section 405 and is coupled thereto via a bend 406. The bend 406 is preferably configured to reduce the stress concentration that may be present in the region. The length of the upright 410 is sized to provide sufficient support and clearance for the acoustic liner 210.

The flexural leg 415 forms an acute angle with the upright 410 and deviates radially away from the weld section 405. The length of the flexural leg 415 is determined by the radial location of the clamping surface 425 relative to the axis 465 of the acoustic liner 210 and a bend radius of the flexural bend 420.

The flexural bend 420 provides a smooth transition between the upright 410 and the flexural leg 415. The bend radius of the flexural bend 420, and the angular tangency point with the flexural leg 415, are determined by the support requirements of, and the localized loading limitations on, the acoustic liner 210.

The clamping surface 425 is a bend tangent to the end of the flexural leg 415 opposite the flexural bend 420. The clamping surface 425 deviates radially from the axis 465 of the acoustic liner 210 and circumferentially from the flexural leg 415 away from the upright 410. The bend radius of the clamping surface 425 is sized to minimize the localized loading imparted on the acoustic liner 210, while still providing adequate support thereto. Preferably, the clamping surface 425 forms an arc having an angle that is approximately twice the acute angle formed between the upright 410 and the flexural leg 415. The radial distance 480 from the axis 465 to the clamping surface 425 is dependant on the support needs and sizing of the acoustic liner 210.

The lead-in 430 is a short linear or curvilinear extension of the clamping surface 425. The lead-in 430 is tangent to the clamping surface 425 and is suitably sized to guide portions of the acoustic liner 210 between the clamp element 402 and the back-strip 435 during assembly of the exhaust muffler.

The back-strip 435 is a curved sheet metal strip that provides a resistive surface against which the clamping surfaces 425 of the linear support 400 can push the acoustic liner 210. At least a portion of the back strip 435 is mechanically fastened to the weld section 405 by any one of numerous conventional techniques, such as, for example, by welding, brazing, riveting, or fastening. The back-strip may also include transverse ridging (not shown) for increased stiffness.

In a free state, without the acoustic liner 210 installed, a gap 455 is formed between the clamping surface 425 and the back-strip 435 that is slightly smaller than the thickness of the acoustic liner 210. This allows an interference fit when the linear support 400 is installed on the acoustic liner 210. Upon installation, the acoustic liner 210 will deflect the clamping surface 425 radially outward (relative to the muffler centerline) by causing elastic deformation in the flexural leg 415 and the flexural bend 420. Additional elastic deformation of the upright 410 where it interfaces with the weld section 405 may also be present.

Figure 16:
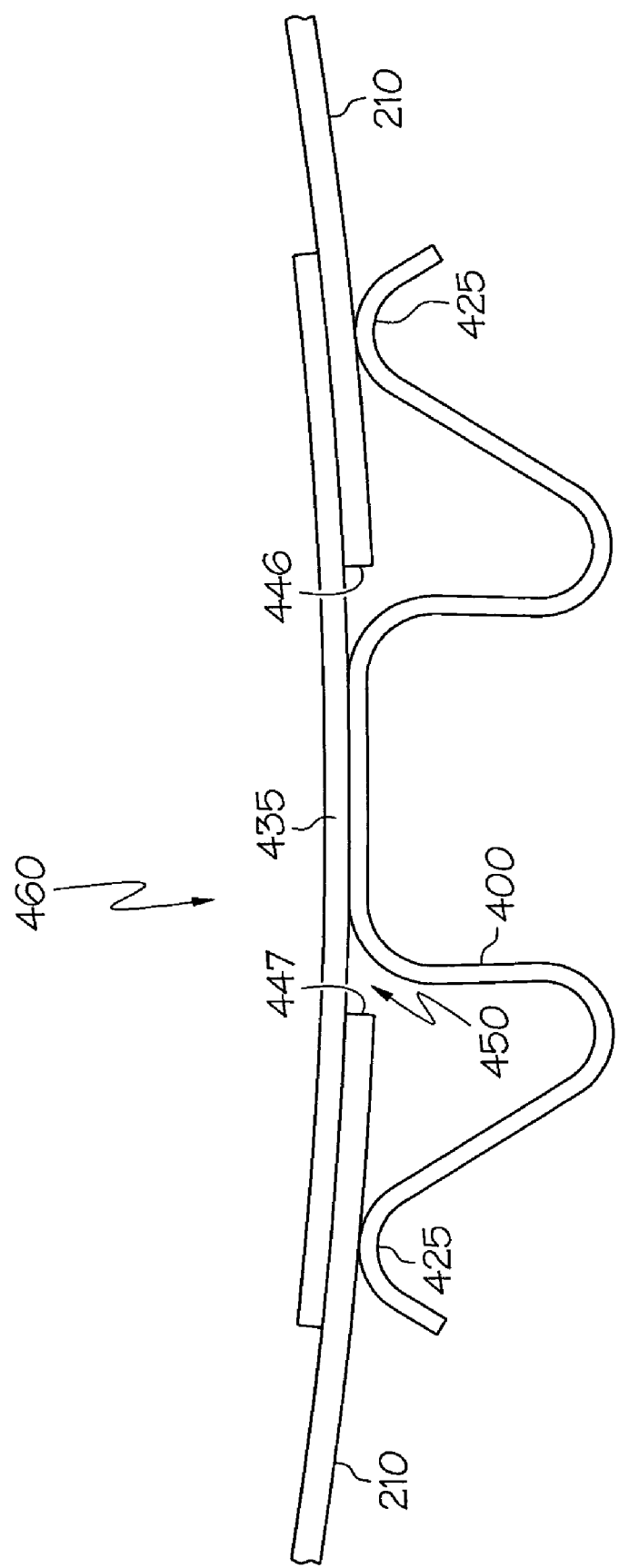
FIG. 16 is a sectional view showing the linear support installed on the acoustic liner.

FIG. 16 shows an acoustic liner assembly 460 with the linear support 400 installed thereon. The linear support 400 is slipped in the axial gap 450 over the adjacent longitudinal edges 446, 447 of the acoustic liner 210. The longitudinal edges 446, 447 are preferably positioned between the clamping surfaces 425 and the back-strip 435 and are restrained by frictional forces imparted by the clamping surfaces 425. In this fashion, when the acoustic liner 210 is subjected to high temperature exhaust gases, the axial gap 450 reduces in size but does not completely close, thereby reducing the circumferential loading on the acoustic liner. The linear support 400 also protects the edges 446, 447 of the acoustic liner 210 from the exhaust gases.

Preferably, both the annular and linear supports 218, 400 are made of material that is relatively easily formable, provides a relatively high modulus of elasticity after forming and welding, and/or resistant to creep and thermal fatigue. Examples of suitable materials, include, for example, nickel-based alloys, such as inconel, or other alloys, such as stainless steel, titanium or hastelloy.

There has now been provided various support means for an acoustic liner that can prevent the development of failure initiation. sites and component failure. The annular support 218 reduces the stress concentrations in the acoustic liner 210 by clamping the acoustic liner 210 against the bellmouth 202. In some embodiments, no mechanical attachments between the acoustic liner 210 and the bellmouth 202, or between the acoustic liner 210 and the annular support 218, exist. The linear support 400 supports the acoustic liner 210 and reduces issues associated with low cycle fatigue and intergranular cracking that initiate in the heat affected zone. While both means of support are described above, it is understood that either one may be used separately, depending on the design of the exhaust muffler 200.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An auxiliary power unit (APU) exhaust system comprising:
    an annular bellmouth having an outer surface;
    an acoustic liner having a tubular sidewall at least partially disposed proximate the annular bellmouth, the tubular sidewall having an outer surface, a first longitudinal edge, a second longitudinal edge, and an axial gap formed between the first and the second longitudinal edges;
    an annular support disposed substantially symmetrically about a longitudinal axis, the annular support comprising:
        a weld leg disposed around the annular bellmouth outer surface and extending substantially parallel to the longitudinal axis;
        a flexural bend having a first end extending from the weld leg away from the longitudinal axis, a first U-shaped curve, and a second end extending toward the longitudinal axis; and
        a clamping surface extending from the flexural bend second end and having a second U-shaped curve, the clamping surface disposed radially outwardly from the longitudinal axis relative to the weld leg and contacting and supplying a force against the acoustic liner outer surface; and
    a linear support disposed at least partially in the acoustic liner axial gap, the linear support comprising:
        a longitudinal clamping element having a weld section, a flexural bend having a first end extending from the weld section and a second end, and a clamping surface extending from the flexural bend second end; and a back strip having a first section coupled to the longitudinal clamping element weld section and a second section forming a longitudinal gap with the clamping surface, wherein the first longitudinal edge is disposed within the longitudinal gap.

2. The APU exhaust system of claim 1, further comprising:
a tubular outer can having an inner peripheral surface that defines a cavity, wherein the acoustic liner, annular support, and linear support are disposed within the tubular outer can cavity.

3. The APU exhaust system of claim 2, further comprising:
an annular baffle coupled to and extending radially inward from the tubular outer can inner peripheral surface, the annular baffle including an opening formed therein through which at least a portion of the acoustic liner and the linear support extend.

4. The APU exhaust system of claim 2, further comprising:
a forward end cap coupled to and extending radially inward from the tubular outer can inner peripheral surface, the forward end cap including an opening formed therein through which at least a portion of the annular bellmouth extends.

5. The APU exhaust system of claim 1, wherein the annular support has a structure selected from the group consisting of a closed annulus, an open annulus, a segmented annulus, and a partially segmented annulus.

6. An annular support for use in an exhaust muffler system and for coupling to an acoustic liner which is disposed substantially symmetrically about a longitudinal axis, the annular support comprising:
a weld leg configured to extend substantially parallel to the longitudinal axis;
a flexural bend having a first end extending from the weld leg away from the longitudinal axis, a first U-shaped curve, and a second end extending toward the longitudinal axis; and
a clamping surface extending from the flexural bend second end and having a second U-shaped curve, the clamping surface disposed radially outwardly from the longitudinal axis relative to the weld leg and configured to contact and supply a force against the acoustic liner outer surface.

7. The annular support of claim 6, wherein the exhaust muffler system includes an annular bellmouth having an outer surface and the weld leg is configured to be coupled to the annular bellmouth outer surface.

8. The annular support of claim 6, wherein the exhaust muffler system includes an exhaust pipe having an outer surface and the weld leg is configured to be coupled to the exhaust pipe outer surface.

9. The annular support of claim 6, further comprising:
a first distance between the weld leg and the longitudinal axis; and
a second distance between the clamping surface and the longitudinal axis that is greater than the first distance.

10. The annular support of claim 9, wherein the difference between the first distance and the second distance is substantially equal to a thickness of the acoustic liner.

11. The annular support of claim 6, wherein the annular support has a structure selected from the group consisting of a closed annulus, an open annulus, a segmented annulus, and a partially segmented annulus.

12. The annular support of claim 6, further comprising a lead-in extending between the first end of the clamping surface to the first U-shaped bend, the lead-in configured to guide the acoustic liner into the annular support.

13. A linear support for use with an acoustic liner of an exhaust system, the acoustic liner having a tubular sidewall and a longitudinal axis extending therethrough, the sidewall having an outer surface, a first longitudinal edge, a second longitudinal edge, and an axial gap formed between the first and second longitudinal edges, the linear support comprising:
a clamping element having a weld section configured to extend substantially parallel to the longitudinal axis, a first flexural bend and a first clamping surface, the first flexural bend having a first end extending from the weld section away from the longitudinal axis, a first U-shaped curve, and a second end extending toward the longitudinal axis, and the second clamping surface extending from the first flexural bend second end and having a second U-shaped curve, the second clamping surface disposed radially outwardly from the longitudinal axis relative to the weld leg and configured to contact and supply a force against the outer surface of the acoustic liner sidewall; and
a back strip configured to extend parallel to the longitudinal axis and having a first section and a second section, the first section coupled to the clamping element weld section, and the second section adjacent the first section and forming a longitudinal gap with the clamping surface.

14. The linear support of claim 13, wherein the gap is configured to receive at least a portion of the first longitudinal edge.

15. The linear support of claim 13, wherein the clamping element further comprises a second flexural bend and a second clamping surface, the second flexural bend having a third end, a third U-shaped curve, and a fourth end, the third end extending from the weld section in an opposite direction from the first flexural bend, and the fourth end extending toward the longitudinal axis and the second clamping surface extending from the second flexural bend second end away from the first flexural bend and having a fourth U-shaped curve, the second clamping surface disposed radially outwardly from the longitudinal axis relative to the weld leg and configured to contact and supply a force against the outer surface of the acoustic liner sidewall.

16. The linear support of claim 15, wherein:
the backstrip further includes a third section disposed adjacent the first section and forming a second longitudinal gap with the second clamping surface; and
the second longitudinal gap is configured to receive the second longitudinal edge.

17. The linear support of claim 13, wherein the weld section is curvilinear.

18. The linear support of claim 13, further comprising a lead-in extending from the clamping surface radially away from the longitudinal axis, the lead-in configured to guide one of the first and second longitudinal edges into the linear support.

19. An auxiliary power unit (APU) exhaust system comprising:
an annular bellmouth having an outer surface;
an acoustic liner having a tubular sidewall at least partially disposed proximate the annular bellmouth, the tubular sidewall having an outer surface; and
an annular support disposed substantially symmetrically about a longitudinal axis, the annular support comprising:
a weld leg disposed around the annular bellmouth outer surface and configured to extend substantially parallel to the longitudinal axis;

a flexural bend having a first end extending from the weld leg away from the longitudinal axis, a first U-shaped curve, and a second end extending toward the longitudinal axis; and a clamping surface extending from the flexural bend second end and having a second U-shaped curve, the clamping surface disposed radially outwardly from the longitudinal axis relative to the weld leg and contacting and supplying a force against the acoustic liner outer surface.

20. An auxiliary power unit (APU) exhaust system comprising:

an annular bellmouth having an outer surface;

an acoustic liner having a tubular sidewall at least partially disposed proximate the annular bellmouth, the tubular sidewall having an outer surface, a first longitudinal edge, a second longitudinal edge, and an axial gap formed between the first and the second longitudinal edges; and a linear support disposed at least partially in the acoustic liner axial gap, the linear support comprising:

a longitudinal clamping element having a weld section configured to extend substantially parallel to the longitudinal axis, a flexural bend having a first end extending from the weld section away from the longitudinal axis, a first U-shaped curve, and a second end extending toward the longitudinal axis, and a clamping surface extending from the flexural bend second end and having a second U-shaped curve, the clamping surface disposed radially outwardly from the longitudinal axis relative to the weld leg and contacting and supplying a force against the acoustic liner outer surface, and a back strip having a first section coupled to the longitudinal clamping element weld section and a second section forming a longitudinal gap with the clamping surface, wherein the first longitudinal edge is disposed within the longitudinal gap.

* * * * *